United States Patent [19]

Banerjee

[11] Patent Number: 5,330,626
[45] Date of Patent: * Jul. 19, 1994

[54] IRRADIATION OF POLYMERIC ION EXCHANGE MEMBRANES TO INCREASE WATER ABSORPTION

[75] Inventor: Shoibal Banerjee, Newark, Del.

[73] Assignee: E. I. du Pont de Nemours and Company, Wilmington, Del.

[ * ] Notice: The portion of the term of this patent subsequent to Jul. 7, 2009 has been disclaimed.

[21] Appl. No.: 25,634

[22] Filed: Feb. 16, 1993

[51] Int. Cl.⁵ .................. C07C 5/00; C25B 13/00; C25B 13/08

[52] U.S. Cl. .................. 204/157.15; 204/296; 521/27; 252/182.13; 252/182.17; 252/182.18; 522/2; 430/286; 430/287

[58] Field of Search .............. 204/157.15, 296; 521/27, 25; 522/2, 102, 103, 112, 149, 153; 430/281, 286, 287; 252/182.13, 182.17, 182.18; C25B 13/00, 13/08

[56] References Cited

U.S. PATENT DOCUMENTS

| | | | |
|---|---|---|---|
| 3,282,875 | 11/1966 | Connolly et al. | 260/29.6 |
| 3,718,627 | 2/1973 | Grot | 260/79.3 MU |
| 4,012,303 | 3/1977 | D'Agostino et al. | 204/159.17 |
| 4,107,005 | 8/1978 | D'Agostino et al. | 204/98 |
| 4,113,922 | 9/1978 | D'Agostino et al. | 429/33 |
| 4,138,426 | 2/1979 | England | 260/465.6 |
| 4,282,795 | 8/1981 | Beretta | 89/148 |
| 4,287,032 | 9/1981 | Pellegri | 204/128 |
| 4,349,422 | 9/1982 | Maloney | 204/98 |
| 4,429,435 | 2/1984 | Walls | 17/15 |
| 4,437,951 | 3/1984 | Bissot et al. | 204/98 |
| 4,439,292 | 3/1984 | Klotz et al. | 204/165 |
| 4,506,035 | 3/1985 | Barnett et al. | 521/53 |
| 4,595,476 | 6/1986 | Bissot | 204/252 |
| 4,602,045 | 7/1986 | Markus et al. | 521/27 |
| 4,661,218 | 4/1987 | Oda et al. | 204/98 |
| 5,128,014 | 7/1992 | Banerjee | 204/296 |

FOREIGN PATENT DOCUMENTS

| | | |
|---|---|---|
| 057065B | 1/1981 | European Pat. Off. . |
| 0133257 | 12/1978 | Fed. Rep. of Germany . |
| 50-13285 | 2/1975 | Japan . |
| 51-131487 | 11/1976 | Japan . |
| 54-26976 | 2/1979 | Japan . |
| 56-100638 | 8/1981 | Japan . |
| 56-44098 | 10/1981 | Japan . |
| 60-55033 | 3/1985 | Japan . |

*Primary Examiner*—Kathryn Gorgos
*Attorney, Agent, or Firm*—Cary A. Levitt

[57] ABSTRACT

The present invention is a process for modifying a fluorinated ion exchange membrane by irradiation of the membrane with a sufficient dose of non-spark-producing radiation to increase water absorption and/or ionic conductivity of the membrane. The membranes are particularly useful in fuel cells and chloralkali cells.

6 Claims, 10 Drawing Sheets

IRRADIATION OF POLYMERIC ION EXCHANGE MEMBRANES TO INCREASE WATER ABSORPTION

FIELD OF THE INVENTION

This invention relates to fluorinated ion exchange polymer films and membranes which are used in electrochemical cells, particularly chloralkali cells and fuel cells. It particularly relates to the irradiation of such films or membranes to increase water absorption and ionic conductivity.

BACKGROUND OF THE INVENTION

The state-of-the-art method for electrolyzing an alkali metal halide, especially sodium chloride (NaCl) or potassium chloride (KCl), is to use a fluorinated membrane to separate the anolyte and catholyte compartments of an electrolytic cell. The membrane permits the alkali metal cation to pass through to the catholyte, but severely restricts the undesirable passage of hydroxyl ion from the catholyte to the anolyte. State-of-the-art fuel cells also use fluorinated membranes to separate the anolyte and catholyte compartments of the cell. Fluorinated membranes are also useful in conventional chemical separations and facilitated transport processes. To make these membranes more attractive, water absorption and ionic conductivity of the membrane should be increased.

Many efforts have been made to improve the performance of these membranes, particularly membranes used in chloralkali cells or fuel cells, by a wide variety of treatments. Most of the efforts have been aimed at obtaining lower voltage, higher current efficiency or lower power consumption.

Water absorption is also an important factor. Increased water content of the ionomeric material usually increases the ion conductivity of the polymer membrane.

It is known that the irradiation of a fluorinated ion exchange membrane may improve cell voltage. U.S. Pat. No. 5,128,014 (Banerjee) discloses and claims a process for irradiating a fluorinated ion exchange membrane.

U.S. Pat. No. 4,439,292 (Klotz et al.) also teaches irradiation of perfluorinated polymeric membranes in the presence of a monomer in order to facilitate crosslinking of the membrane to lower voltage in an electrolytic cell. U.S. Pat. No. 4,439,292 reduced cell voltage by treating fluorinated carboxyl membranes with corona discharge, a process in which an electrical discharge or spark is passed from one electrode to another through a gas and through the sample to be treated. Klotz et al. found that heating damaged the membrane. They chose to keep the temperature below 80° C., preferably below +22° C., and most preferably below −20° C. To prevent heat damage, Klotz et al. exposed the sample to corona discharge 1000–5000 times, with cooling between exposures. Clearly, the need to use thousands of exposures is a severe limitation to the usefulness of this process.

SUMMARY OF THE INVENTION

In the present invention, a fluorinated ion exchange membrane is irradiated with a non-spark-producing ionizing radiation. The membrane is irradiated with a dose of radiation sufficient enough to provide improved water absorption and/or ionic conductivity. The tensile properties of the membrane are not significantly altered by irradiation.

DETAILED DESCRIPTION OF THE INVENTION

The process for modifying a fluorinated ion exchange membrane involves irradiating the membrane with a non-spark-producing ionizing radiation. The sources of this type of radiation include but are not limited to (1) gamma sources, such as Co-60 and Cs-137, (2) beta sources (often referred to as electron beam accelerators or linear accelerators, and (3) x-rays. All ionizing radiation produces free radicals in the absorbing medium (the material being irradiated). The behavior of the free radicals produced is determined by the nature of the absorbing medium. The main difference between these three sources is the manner in which the radiation travels through the material being irradiated.

The most common sources of gamma radiation are Co-60 and Cs-137. Co-60 is made by pre-forming non-radioactive Co into rods or bars, then subjecting them to a neutron source such as the neutrons produced in a nuclear power plant.

Gamma radiation is emitted in a complete sphere, requiring the target material to completely surround the source if all of the irradiation is to be utilized. Gamma radiation is absorbed on a logarithmic basis as it travels in a material. In order to get a more uniform dose in the material, double sided exposure may be used, but is not necessary with a relatively thin material such as a chloralkali membrane. Gamma rays have a major advantage, penetration. This is not important in irradiating thin membranes.

The major disadvantages of radioactive sources are (1) high maintenance cost (replacement of source material), (2) the need for extreme safety precautions, (3) relatively low dose rate, and (4) the problems associated with transporting, storing and disposing of highly radioactive substances. In addition, since the radioactive decay cannot be controlled (turned on and off) the facility must be operated continuously to realize a high efficiency.

X-rays are produced when high energy electrons are used to bombard metals. The efficiency of the x-ray source is determined by the molecular or atomic weight of the target and by the energy (accelerating voltage) of the electrons. The higher the molecular weight of the target material, the greater the efficiency. The efficiency is also proportional to the accelerating voltage. The penetration characteristics of x-rays are 5–20% greater than those of gamma rays.

The source of beta radiation is an electron beam accelerator. Electrons can be accelerated by (1) high DC voltages, (2) electric pulses, (3) magnetic pulses, or (4) a combination of these three. COCKCROFT-WALTON, isolated core, resonant transformer, DYNAMITRON (high voltage generated by a set of cascade rectifiers coupled to an oscillator), KLYSTRON (evacuated electron beam generator) and linacs are some of the names given to the techniques of producing high voltages. Absorption of high energy electrons in material is such that 90% of the beam energy may be used with a maximum to minimum dose ratio of 1.4 using a single pass under the beam.

The main advantages of the electron beam accelerators are the (1) high power and high throughput, (2) relatively low unit cost, (3), high dose rate, and (4) intrinsic safety. In addition, since electron accelerators may be turned off, the facilities do not have to be operated continuously. The main disadvantage of electron beam accelerators is the relatively small penetration of the electrons, about 2.1 cm in water for a 5 megarad source. This is not a significant disadvantage for irradiation of membranes, which are thin. Therefore, electron beam accelerators are the preferred source of ionizing radiation for this invention.

The membranes treated in this invention may be any fluorinated ion exchange membrane or film in hydrolyzed form or unhydrolyzed form known in the art for electrolysis of chloride salts, for use in fuel cells, chemical separations, facilitated transport or the like. By hydrolyzed form, it is meant to include sulfonate or carboxylate salts and sulfonic and carboxylic acids.

In the irradiation process, the membrane is exposed to irradiation for a sufficient time and at a sufficient dose rate to cause an increase in water absorption and/or an increase in ionic conductivity. The total dosage should be at least 0.1 megarads, preferably about 5.0–10.0 megarads, most preferably 5.0 megarads. Doses higher than 10 megarads are possible but, as can be seen in the Examples and the Figures, does not provide further improvement in the properties of the membrane.

The increased water absorption of the membrane is surprising in view of U.S. Pat. No. 4,439,292 (Klotz et al.). Klotz et al. treated a perfluorinated polymer membrane with a corona discharge from 0.1 to 10 Ah/m$^2$ at a temperature below 80° C. Klotz et al. reported that the water content of the membrane is virtually unchanged by the corona treatment at low temperatures.

It is believed that the increased water absorption of irradiated membranes having sulfonyl groups is due to the presence of carboxylate groups after irradiation. In particular, it is believed that irradiation generates acid-type carbonyl containing functional groups which are converted to carboxylate groups on further hydrolysis. The carboxylate groups are ionic and tend to absorb more water.

The total dosage of radiation is a function of the time of each exposure, the dose rate, and the number of exposures. Preferably the number of exposures should be low, most preferably one. The dose rate will depend on the type of radiation used, the device used to generate the radiation, and the energy input to the source of radiation. For a given dose rate, the time of exposure can be varied to provide the preferred total dosage. A preferred way of controlling the time of exposure is to vary the speed of a conveyor system carrying the membrane through the irradiation zone. The membranes may also be irradiated in a so-called "shield pack" or a package or container which is not effected by the radiation. Such irradiation may be performed under ambient atmosphere, under vacuum or otherwise. Such a package or container prevents damage to the membrane from excessive handling.

The irradiated membrane is broadly useful in the chloralkali industry for providing a more efficient and economical operation of chloralkali cells. The irradiated membrane is also broadly useful in the fuel cell industry, chemical separations, facilitated transport and the like.

The membrane used in this invention is fluorinated, which means that at least 90%, preferably at least 95%, and most preferably all of the atoms attached to the carbons are F atoms or side-chain ether groups, which may contain functional groups hydrolyzable to salts. The non-fluorine atoms, if used, may be H, Cl, or Br.

The membrane used in the electrolytic cells according to the process of this invention may consist of two or more layers, where preferably the one layer in contact with the anolyte has pendant sulfonyl groups. For membranes having more than one polymer layer, it is possible to irradiate the layers independently and then laminate the layers to form the membrane or the multilayer membrane may be irradiated after the layers have been laminated.

The sulfonyl polymers according to this invention can be made are fluorinated polymers with side chains containing the group —$CF_2CFR'SO_2X$, wherein R' is F, Cl, $CF_2Cl$ or a $C_1$ to $C_{10}$ perfluoroalkyl radical, and X is F or Cl, preferably F. Ordinarily, the side chains will contain —$OCF_2CF_2CF_2SO_2X$ or —$OCF_2CF_2SO_2F$ groups, preferably the latter. The perfluorinated polymers are preferred.

The salt-form carboxylic polymers of which the membrane layer in contact with the catholyte is made have a fluorinated hydrocarbon backbone chain to which are attached side chains carrying, before hydrolysis to the salt form, certain functional groups hydrolyzable in an alkaline medium to carboxylate groups, such as nitrile or ester groups.

The sulfonyl polymers and carboxylic polymers described herein are carboxylate groups, such as nitrile or ester groups.

The sulfonyl polymers and carboxylic polymers described herein are not limiting and the irradiation process is useful for a wide range of fluorinated ion exchange membranes. The polymers herein and the corresponding methods of polymerization are well known and described in the prior art.

The copolymers used in the manufacture of membrane layers used in the process of the present invention should be of high enough molecular weight to produce films which are self-supporting in both their melt-fabricable (precursor) form and in the hydrolyzed ion exchange form.

A membrane having at least one layer of a copolymer having sulfonyl groups in melt-fabricable form and a layer of a copolymer having carboxyl group in melt-fabricable form, such as made by coextrusion, can be used as one of the component films in making, by hydrolysis, the membrane to be used in the process of the present invention. Such a laminated structure will be occasionally referred to as a bimembrane. Bimembranes are well known in the art.

It is possible to use in the present process a carboxylate/sulfonate bimembrane, and it is possible for the sulfonate layer to have an equivalent weight lower than that of the carboxylate layer by at least 50 units. It is also possible to use an all-carboxylate membrane with a layer of lower equivalent weight on the anolyte side.

The membrane used in this invention may also comprise three layers, for example:
a) on the catholyte side, a carboxylate layer of a 5–50 micrometer thickness, preferably 20–40 micrometers, with an equivalent weight suitable to provide a water transport of 3.0–4.0 moles of water per gram-atom of Na,
b) in the middle, an optional carboxylate layer with a lower equivalent weight and a thickness in the same range, as that of (a), and
c) on the anolyte side, a sulfonate layer of a 50–250 micrometer thickness, preferably 75–100 micrometers.

Membranes usually have an overall thickness of 50–300 micrometers, especially 125–200 micrometers.

For use in electrolysis of brine to produce high concentrations of caustic, the membrane should have all of the functional groups converted to ionizable functional groups. These will be sulfonate and carboxylate groups, preferably the sodium or potassium salts thereof.

The membrane may be unreinforced film or bifilm, but for dimensional stability and greater notched tear resistance, it is common to use a reinforcing material. It is customary to use a fabric made of a fluorocarbon resin such as polytetrafluoroethylene or a melt-processable copolymer of tetrafluoroethylene with hexafluoropropylene or with perfluoro(propyl vinyl ether). These may be woven into fabric using various weaves, such as the plain weave, basket weave, leno weave, or others. Relatively open weaves are preferred because the electric resistance is lower. A porous sheet may be used as a support. Other perhalogenated polymers such as polychlorotrifluoroethylene may also be used, but perfluorinated supports have the best resistance to heat and chemicals. The fibers used in the support fabrics may be monofilaments or multifilament yarns. They may be of ordinary round cross-section or may have specialized cross-sections. Oblong or rectangular cross-sections, if suitably oriented to the membrane, make it possible to get more reinforcing action with a thinner overall membrane. It may be desirable to use sacrificial fibers such as rayon, paper, or polyester, along with the fluorocarbon fibers. Care should be taken, however, not to have the soluble or degradable fibers extend from one surface to the other, otherwise the nonporous membrane may become a porous diaphragm, and the caustic product may contain too much salt. Even with a cloth or mesh of fluorocarbon fibers, it is preferred not to have the cloth penetrate the surface of the membrane on the cathode side. The fabric employed may be calendered before lamination to reduce its thickness. In a bimembrane, the fabric may be in the sulfonate or carboxylate layer, or in both, but is more often in the sulfonate layer, which is usually thicker. In place of fabric, fibrils can be used.

The membrane or bimembrane may be used flat in various known filter press cells, or may be shaped around an electrode. The latter is especially useful when it is desired to convert an existing diaphragm cell to a membrane cell in order to make higher quality caustic.

Conversion to ionizable functional groups is ordinarily and conveniently accomplished by hydrolysis with acid or base, such that the various functional groups described above in relation to the melt-fabricable polymers are converted respectively to the free acids or the sodium salts thereof. Such hydrolysis can be carried out in an aqueous bath of either a mineral acid or sodium hydroxide. Alkaline hydrolysis is preferred as it is faster and more complete. Use of hot hydrolysis baths, such as near the boiling point of the solution, is preferred for rapid hydrolysis. The time required for hydrolysis increases with the thickness of the structure. It is advantageous to include in the hydrolysis bath a water-miscible organic compound such as, e.g., dimethyl sulfoxide, to swell the membrane and thus increase the rate of hydrolysis.

Membranes can be swelled with polar solvents (such as lower alcohols or esters, tetrahydrofuran, or chloroform) and then dried, preferably between flat plates, to improve their electrolytic performance. Before mounting in commercial cell support frames, which may be 1–5 meters on a side, the membrane can be swelled so that it will not wrinkle after it is clamped in the frame and exposed to electrolytic fluids. Among the swelling agents that can be used are water, brine, sodium bicarbonate solution, caustic, lower alcohols, glycols, or mixtures thereof.

The configuration of the cell, electrodes and other associated equipment are not critical to this invention and are well known in the art. The process for operating the electrochemical cell is also not critical and is well known in the art.

EXAMPLES

The invention will be further clarified by a consideration of the following examples, which are intended to be purely exemplary of the use of the invention.

EXAMPLE 1

The film used in this example is formed from a 6.58:1 mole ratio TFE:$CF_2$=$CFOCF_2CF(CF_3)OCF_2CF_2SO_2F$ copolymer (commercially available from E.I. du Pont de Nemours and Company as NAFION ®N117). The equivalent weight of the film was nominally 1100 and the thickness was 7 mils. The film was hydrolyzed by soaking in a solution of 14% KOH/30% dimethylsulfoxide/56% water at 80°–100° C. for 16 hours. The film was cut into 5 cm×5 cm pieces, weighing about 0.5–1.0 grams.

The hydrolyzed film was irradiated in a vacuum with an electron beam at Irradiation Industries, Inc., Gaithersburg, Md. The equipment used for irradiation was a 3.0 million electron volt, 25 milliampere Dynamitron manufactured by Radiation Dynamics, Inc. The irradiation dosage for the hydrolyzed film was chosen to be 0, 1, 5, 10, or 40 megarads.

The irradiated membrane pieces were washed in deionized water. The pieces were dried in a vacuum oven at 90° C. (with a nitrogen purge) overnight. The dry pieces were removed from the oven and weighed. The pieces were then put in a beaker containing 80° C. deionized water for one hour. The membrane pieces were then quickly dried on a towel and weighed.

Ionic conductivity was determined by dielectric analysis as follows:

A one-inch square sample of the film was dried in a vacuum oven at 100° C. for 12 hours. Then gold was sputtered (for complete contact with the electrodes) on both sides of the film. The sputtered gold had a thickness of 300 Angstroms and covered an area of 334.4 $mm^2$. This gold-sputtered sample was held between the two electrodes of a dielectric analyzer (T.A. Instruments, New Castle, Del.) with a force of 300 Newton. Electric field was applied from 1–100,000 Hz in intervals of decades and the sample was scanned from −100° C. to 100° C. at a rate of 3° C./minute at each frequency.

In dielectric analysis, a sinusoidal voltage was applied, creating an alternating electric field. This produced polarization in the sample, which oscillates at the same frequency as the electric field but has a phase angle shift. This phase angle shift is measured by comparing the applied voltage to the measured current. The measured current is separated into capacitive and conductive components. A loss factor which is proportional to conductance and represents the energy required to align dipoles and move ions may be determined and is used to calculate bulk ionic conductivity.

FIGS. 1, 2, 3 and 4 show the ionic conductivity, cell temperature and frequency for membranes irradiated with doses of 0, 1, 5 and 10 megarads, respectively.

The ionic conductivity of the membrane is optimum at about 5 megarads of radiation. At 10 megarads of radiation, some of the advantageous increase in ionic conductivity is lost, possibly as a result of degradation of the polymer membrane. The loss in ionic conductivity at elevated doses of radiation appears to be consistent with the water absorption results reported in Example 2 which indicate increased water absorption when the membrane is exposed to radiation; however, the particular level of radiation does not appear to be important.

EXAMPLE 2

An ion exchange film of Example 1 (NAFION® N117) was prepared. Two other films used in this Example were formed from a 5:1 mole ratio of TFE:C-FOCF$_2$CF(CF$_3$)OCF$_2$SO$_2$F copolymer. The equivalent weight of the film was nominally 950 and the thickness was 5 mils. One of the films was hydrolyzed using the procedure in Example 1 to convert it to the SO$_3^-$K$^+$ form. The other film was used in the SO$_2$F form.

The films were irradiated as in Example 1 at radiation doses of 0–10 mrads. The irradiated films were then washed and dried as in Example 1. The 5 mil SO$_2$F form film was then hydrolyzed as in Example 1.

Water absorption measurements of all membranes were performed as follows: The films were washed and dried overnight in a vacuum oven at 90° C., then weighed. Then, the films were boiled in deionized water for two hours. The excess water from the film surfaces was wiped and the films were weighed. The difference in this weight and the dry weight was the amount of water absorbed by the film. The process of drying, then boiling in water and weighing was repeated five (5) times for each film to obtain reliable data for water absorption.

Figure 1:
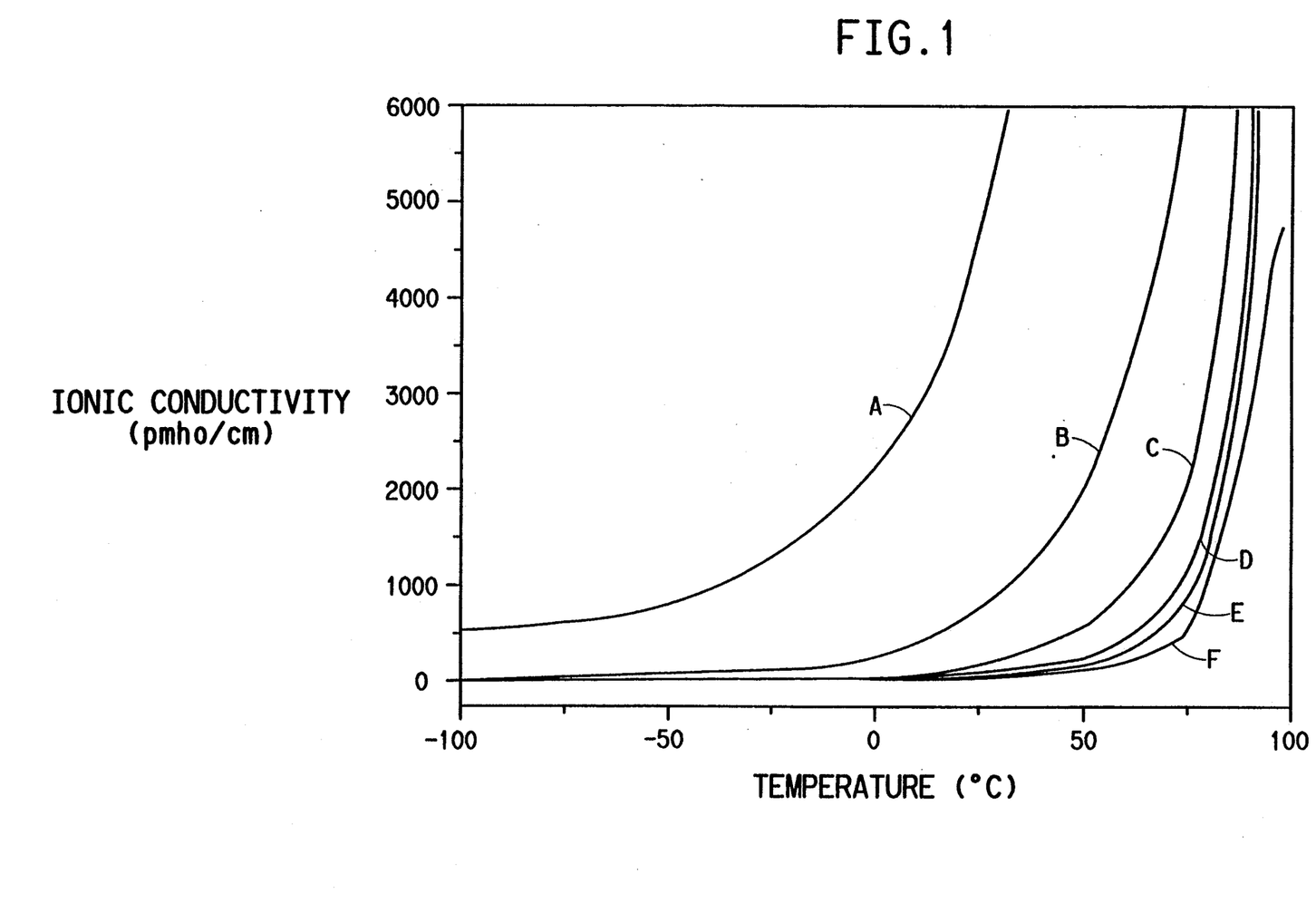
FIGS. 1–4 show graphs of ionic conductivity vs. temperature for fluorinated ion exchange membranes exposed to irradiation levels of 0, 1, 5 and 10 megarads, respectively.
Figure 2:
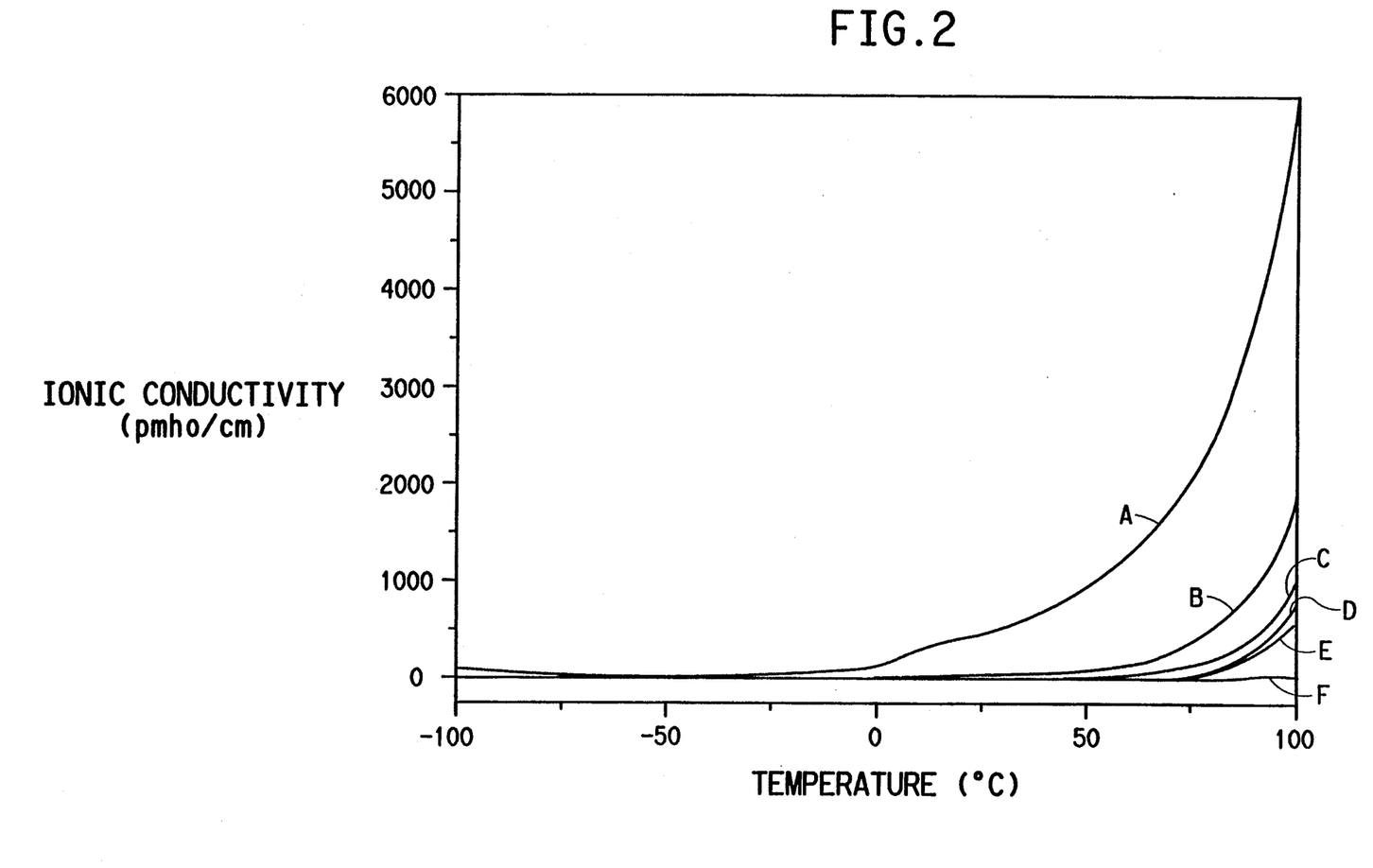
Figure 3:
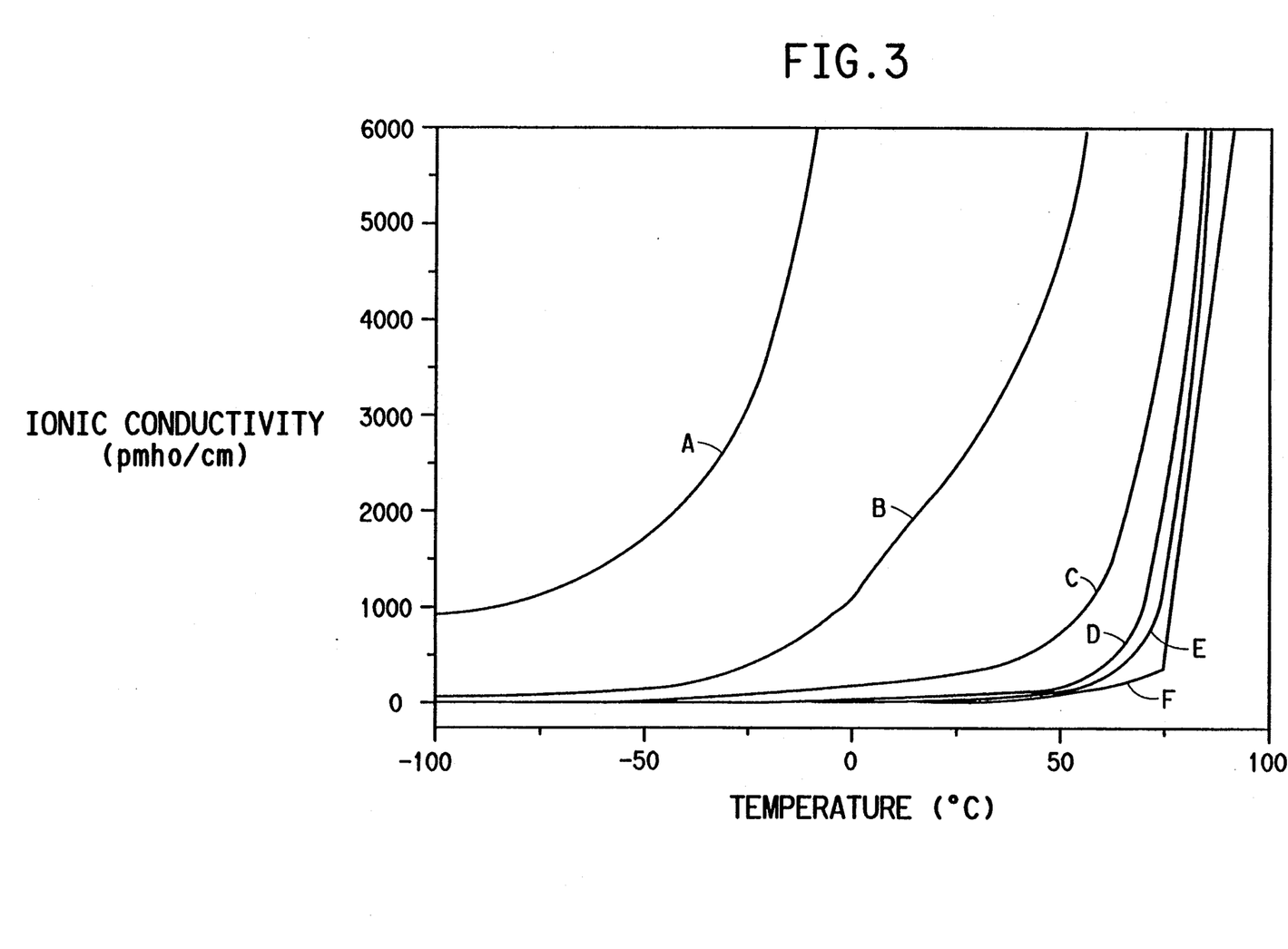
Figure 4:
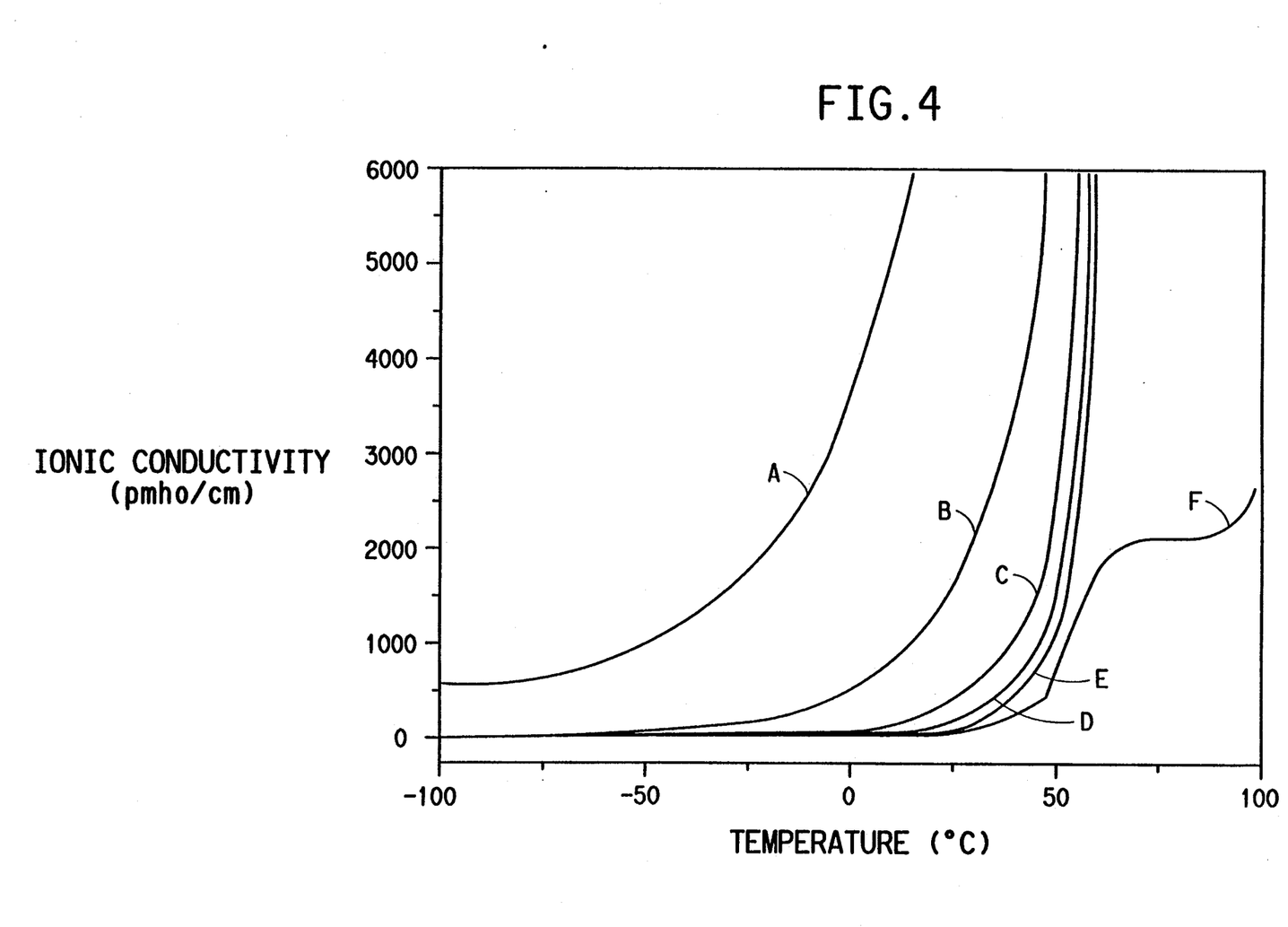
Figure 5:
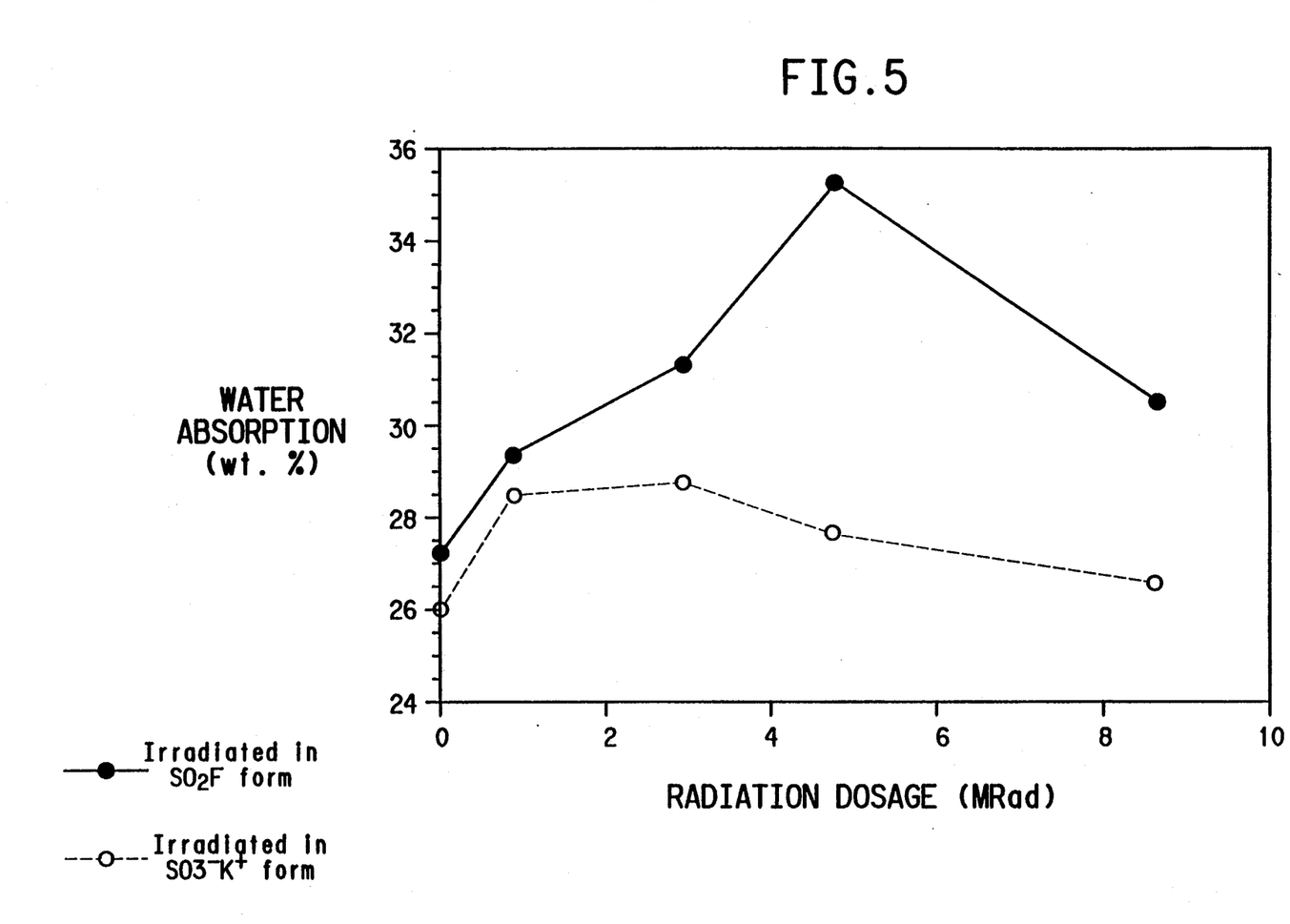
FIGS. 5–7 show graphs of water absorption vs. radiation dosage for various fluorinated ion exchange membranes exposed to irradiation levels of 0–10 mrad.
Figure 6:
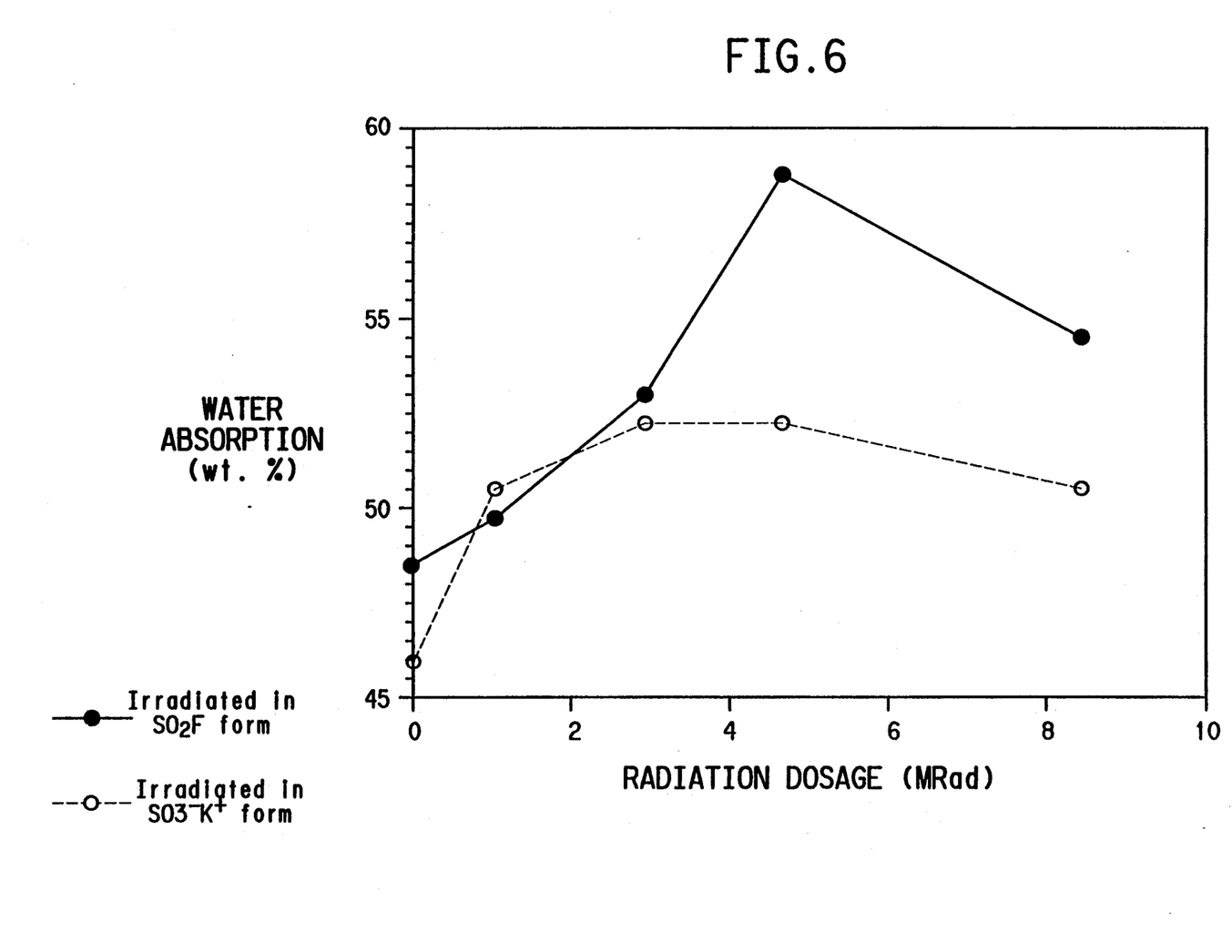

FIG. 5 shows the water absorption vs. radiation dosage for both 5 mil ion exchange films in the K$^+$ form. FIG. 6 shows the water absorption vs. radiation dosage for the same two 5 mil ion exchange films after they have been converted to the H$^+$ form by treating in HCl for one hour at 85° C. It is apparent that the irradiated membranes have significantly increased water absorption, especially when irradiated int he sulfonyl fluoride form at about 5 mrad.

Figure 7:
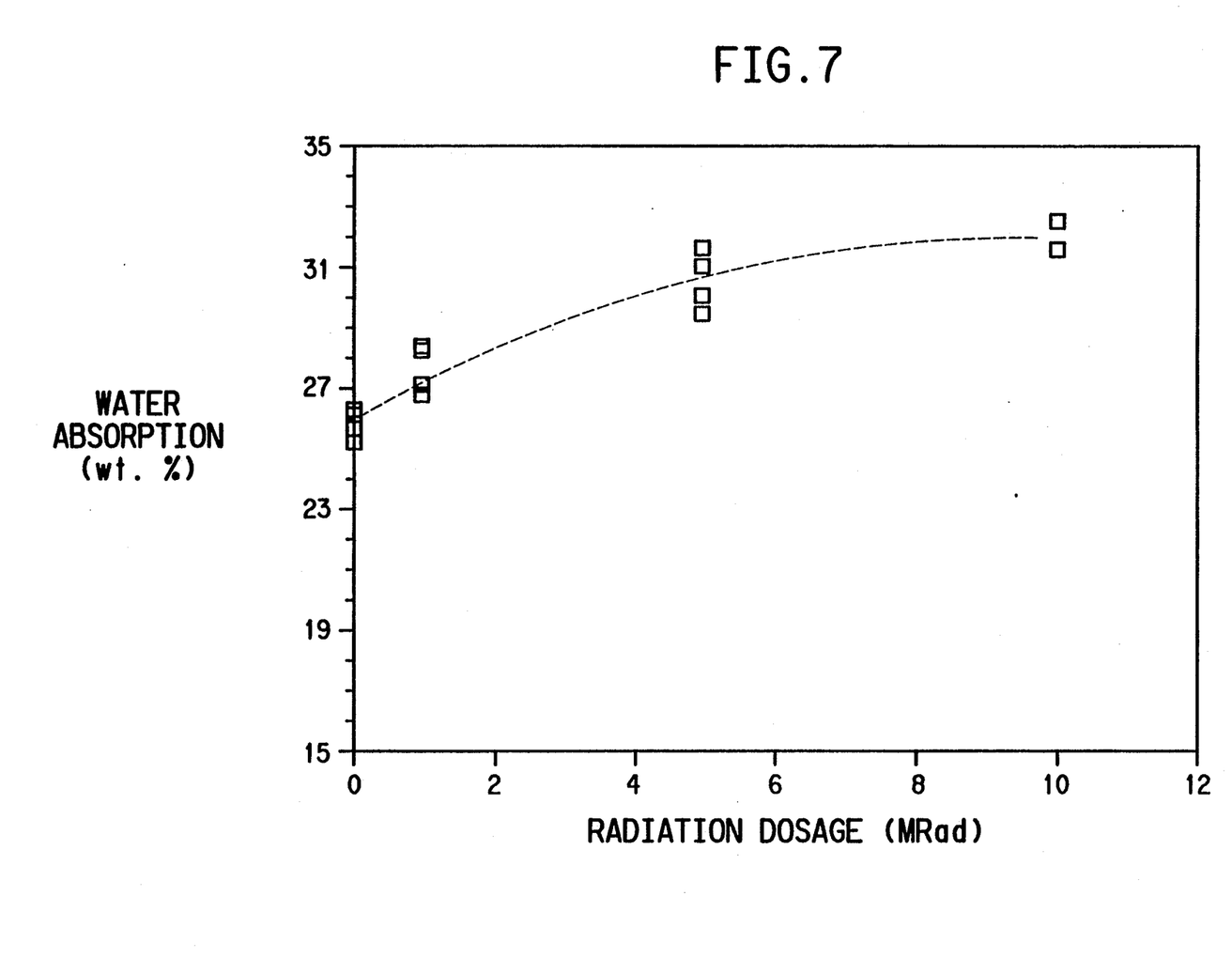

FIG. 7 shows the water absorption for the 7 mil membrane (NAFION® N117), which was irradiated in the hydrolyzed form (SO$_3^-$K$^+$). This membrane also exhibits increased water absorption.

Figure 8:
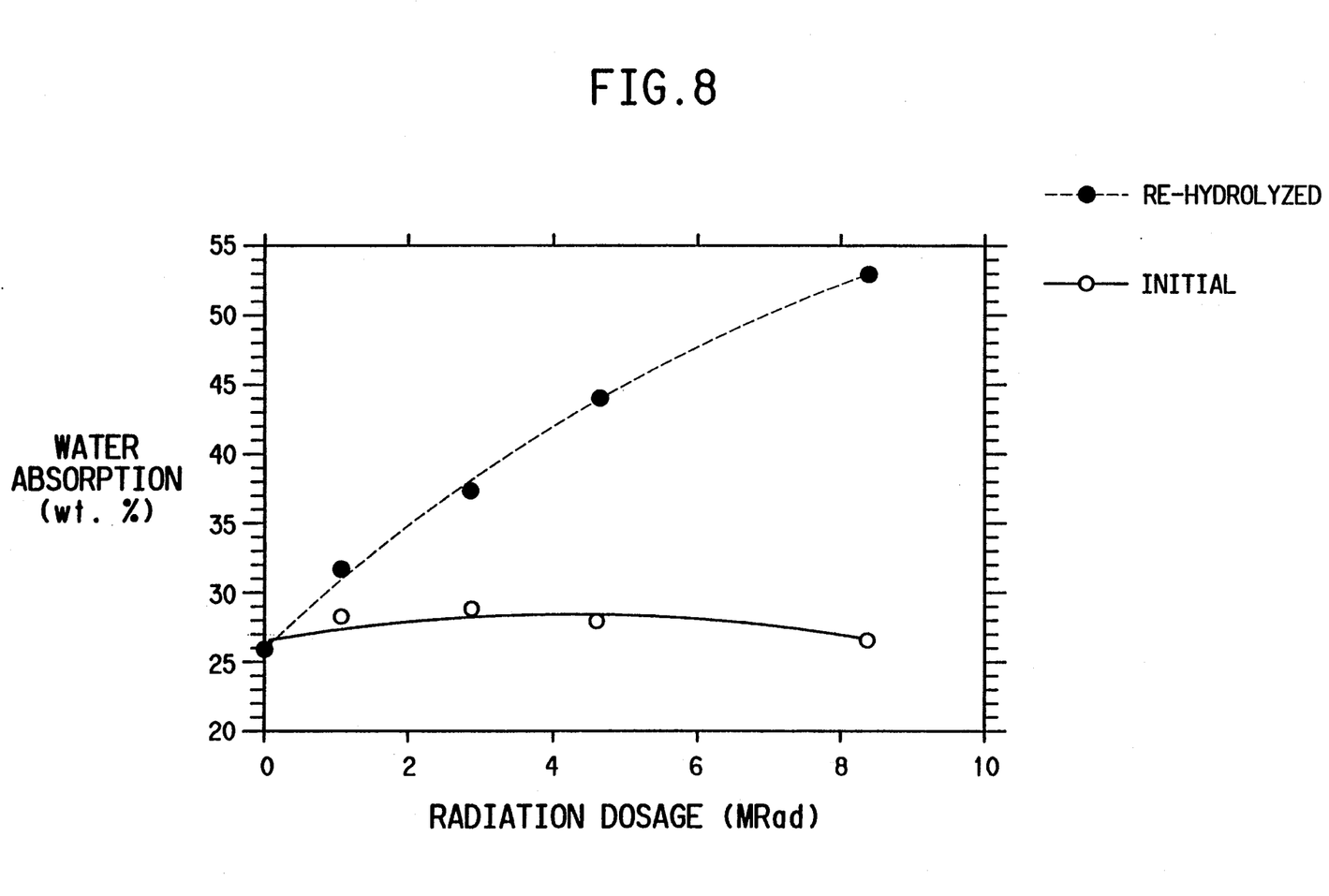
FIG. 8 is a graph showing water absorption vs. radiation dosage for a membrane which was irradiated in the sulfonic acid salt ($SO_3^-K^+$) form and then was rehydrolyzed.

The 5 mil film that was irradiated in the SO$_3^-$K$^+$ form was again rehydrolyzed using the same procedure as in Example 1. The water absorption of this rehydrolyzed film is shown in FIG. 8. In this Figure, it is seen that on rehydrolysis the water absorption increases even more than the water absorption of the same film before rehydrolysis.

EXAMPLE 3

Figure 9:
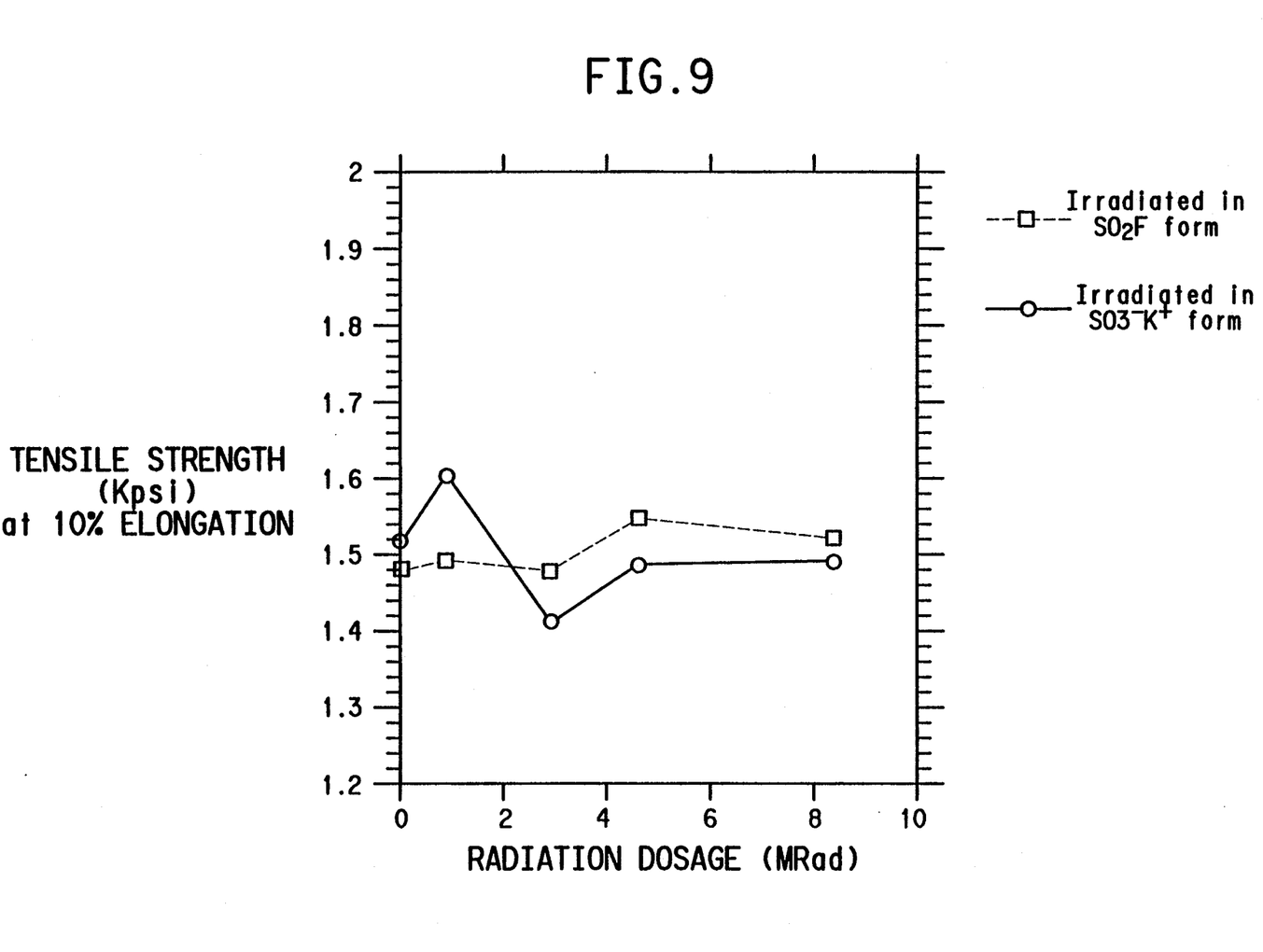
FIGS. 9 and 10 are graphs showing tensile stress and tensile modulus, respectively, of irradiated membranes.
Figure 10:
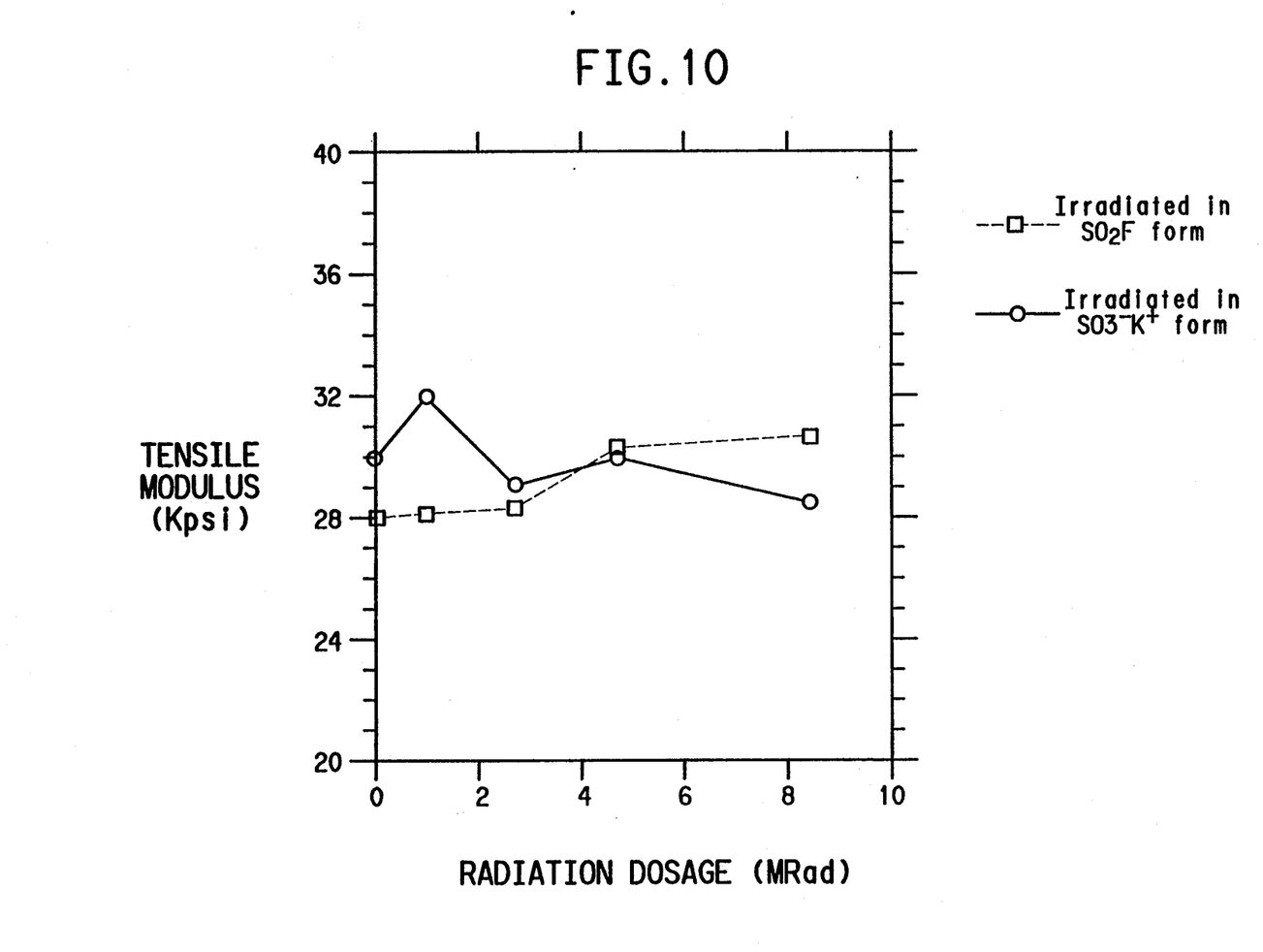

The tensile strength of the two 5 mil films from Example 2 was measured. Tensile stress at 10% elongation and tensile modulus were tested by ASTM D882. FIGS. 9 and 10 show tensile stress and tensile modulus of the membranes at different levels of radiation. The tensile properties of the membrane do not change significantly after irradiation.

I claim:

1. A process for modifying a fluorinated ion exchange membrane comprising irradiating said membrane, in an environment substantially free of a monomer which would graft polymerize with components of said membrane, with a non-spark-producing ionizing electron beam radiation with a dose of about 1–10 megarads.

2. The process of claim 1 wherein the dose is achieved in a single exposure to the radiation.

3. The process of claim 1 wherein the membrane is irradiated in its unhydrolyzed form.

4. The process of claim 1 wherein the membrane is irradiated in its hydrolyzed form.

5. A fluorinated ion exchange membrane made by the process of claim 1.

6. The membrane of claim 5 wherein the membrane comprises at least two layers.

* * * * *